United States Patent
Rau (10) Patent No.: US 8,375,156 B2
(45) Date of Patent: Feb. 12, 2013

(54) INTELLIGENT PCI-EXPRESS TRANSACTION TAGGING

(75) Inventor: Frank Rau, Heilbronn (DE)

(73) Assignee: Dialogic Corporation, Montreal, Quebec (CA)

( * ) Notice: Subject to any disclaimer, the term of this patent is extended or adjusted under 35 U.S.C. 154(b) by 276 days.

(21) Appl. No.: 12/953,949

(22) Filed: Nov. 24, 2010

(65) Prior Publication Data

US 2012/0131252 A1    May 24, 2012

(51) Int. Cl.
- *G06F 13/12* (2006.01)
- *G06F 13/28* (2006.01)
- *G06F 3/00* (2006.01)

(52) U.S. Cl. ............... 710/308; 710/5; 710/22; 710/311

(58) Field of Classification Search .................. 710/308
See application file for complete search history.

(56) References Cited

U.S. PATENT DOCUMENTS

| | | | |
|---|---|---|---|
| 7,043,667 B2* | 5/2006 | Smith | 714/43 |
| 7,120,722 B2* | 10/2006 | Sharma et al. | 710/305 |
| 7,502,881 B1* | 3/2009 | Davis | 710/120 |
| 7,562,176 B2* | 7/2009 | Kloeppner et al. | 710/314 |
| 7,705,850 B1 | 4/2010 | Tsu | |
| 8,006,017 B2* | 8/2011 | Futral et al. | 710/244 |
| 8,205,026 B2* | 6/2012 | Futral et al. | 710/244 |
| 2003/0217219 A1* | 11/2003 | Sharma et al. | 710/311 |
| 2006/0136639 A1* | 6/2006 | Futral et al. | 710/244 |
| 2007/0028017 A1* | 2/2007 | Mishra et al. | 710/52 |
| 2007/0130397 A1* | 6/2007 | Tsu | 710/62 |
| 2008/0209099 A1* | 8/2008 | Kloeppner et al. | 710/314 |
| 2010/0011146 A1* | 1/2010 | Saghi | 710/314 |
| 2010/0306442 A1* | 12/2010 | Gregg | 710/313 |
| 2011/0153875 A1* | 6/2011 | Khericha et al. | 710/22 |
| 2011/0320666 A1* | 12/2011 | Gregg et al. | 710/300 |
| 2012/0036291 A1* | 2/2012 | Futral et al. | 710/39 |
| 2012/0042106 A1* | 2/2012 | Futral et al. | 710/244 |

* cited by examiner

*Primary Examiner* — Ryan Stiglic (74) *Attorney, Agent, or Firm* — Preti Flaherty Beliveau & Pachios LLP (57) ABSTRACT

Systems and methods of routing data units such as data packets or data frames that provide improved system performance and more efficient use of system resources. The disclosed systems and methods employ memory mapping approaches in conjunction with transaction ID tag fields from the respective data units to assign each tag value, or at least one range of tag values, to a specified address, or at least one range of specified addresses, for locations in internal memory that store corresponding transaction parameters. The disclosed systems and methods can also apply selected bits from the transaction ID tag fields to selector inputs of one or more multiplexor components for selecting corresponding transaction parameters at data inputs to the multiplexor components. The disclosed systems and methods may be employed in memory-read data transfer transactions to recover the transaction parameters necessary to determine destination addresses for memory locations where the memory-read data are to be transmitted.

33 Claims, 7 Drawing Sheets

INTELLIGENT PCI-EXPRESS TRANSACTION TAGGING

CROSS REFERENCE TO RELATED APPLICATIONS

Not applicable

STATEMENT REGARDING FEDERALLY SPONSORED RESEARCH OR DEVELOPMENT

Not applicable

FIELD OF THE INVENTION

The present application relates generally to systems and methods of routing data units such as data packets or data frames, and more specifically to systems and methods of routing such data units that employ memory mapping approaches in conjunction with transaction ID tag fields from the respective data units for improved system performance and more efficient use of system resources.

BACKGROUND OF THE INVENTION

Data packet routing systems are known that employ the Peripheral Component Interconnect Express system (also referred to herein as the "PCIe system") for enabling data transfers between an application layer device and a host device over a pair of PCIe links (TX/RX). For example, the application layer device may be a router connected between the PCIe system and a number of client devices. Each PCIe link is a point-to-point serial communication channel connected between a PCIe port of the application layer device and a PCIe port of the host device, allowing the respective devices to transmit/receive PCIe requests such as memory-read/write requests over the respective PCIe links. The PCIe system can handle several different types of data transfers, including posted data transfers such as memory-write data transfers, and non-posted data transfers such as memory-read data transfers. The PCIe system includes a PCIe system core, which is a controller operative to implement the PCIe system protocol, and to identify and resolve the PCIe system protocol layers, including a physical/media access control (mac) layer, a link layer, and a transaction layer. The application layer device can use the PCIe system protocol to implement a variety of data transfer applications through the PCIe links, including, but not limited to, multimedia file transfer applications, real-time video/voice streaming applications, and video conferencing applications.

In a conventional data packet routing system, the application layer device may employ the PCIe system protocol to implement a data transfer application that utilizes a transaction ID-based data packet routing mechanism. Each transaction ID is a 24-bit wide field embedded in a data packet that can be used to provide a unique identifier for a requester of the data packet. For example, in a data packet transfer transaction involving the application layer device and the host device, if the data packet transfer transaction includes a memory-read data transfer that requires an acknowledgment-type data packet (also referred to herein as a "completion data packet") from the host device, then the application layer device can use information contained in the transaction ID field of each completion data packet to route the data packet to the client device that initiated the data packet transfer transaction. More specifically, the transaction ID field includes a 5-bit tag field (extendible to 8 bits) that contains information defining a tag value for use in identifying the client device, which can initiate one or more data packet transfer transactions within a predetermined period of time. Some or all of these data packet transfer transactions may include memory-read data transfers, requiring corresponding completion data packets from the host device. All such completion data packets received at the application layer device would generally look the same, except for the tag fields included in the transaction IDs of the respective completion data packets. Accordingly, the application layer device can access the information contained in the tag fields to distinguish between the different completion data packets received from the host device, and to identify the client device that initiated the data packet transfer transaction.

In another conventional data packet routing system, a direct memory access (DMA) processing engine may be employed to perform multiple memory-read/write data transfers independently of the system central processing unit (CPU), thereby reducing the overhead of the system CPU. For example, a client device may initiate a data packet transfer transaction including a memory-read data transfer, and the DMA processing engine may prepare a corresponding memory-read request data packet, and transmit the memory-read request data packet to a host device over a PCIe link. In response to receiving the memory-read request data packet, the host device transmits a completion data packet to the DMA processing engine. The DMA processing engine receives the completion data packet from the host device over another PCIe link, and accesses the requested memory-read data contained in the completion data packet for subsequent forwarding to the client device that initiated or is the target of the data packet transfer transaction. The DMA processing engine can identify the client device using the information contained in the transaction ID tag field embedded in the completion data packet.

One drawback of the conventional data packet routing systems described above is that 32 different tag values defined by the information contained in the 5-bit tag field, along with a set of transaction parameters (e.g., routing information, a destination address, etc.) for each tag value, have to be stored in internal memory, thereby expending a significant amount of system resources. Further, following each memory-read request, the tag value contained in each completion data packet has to be compared with the different tag values stored in the internal memory in order to access the proper set of transaction parameters. Such tag processing can require many clock cycles to complete, and, as a result, can significantly impair overall system performance. Moreover, in the conventional data packet routing system that employs the DMA processing engine, such tag processing can place constraints on the number of outstanding memory-read requests that the DMA processing engine might otherwise issue.

It would therefore be desirable to have systems and methods of routing data packets that avoid at least some of the drawbacks of the conventional data packet routing systems described above.

BRIEF SUMMARY OF THE INVENTION

In accordance with the present application, systems and methods of routing data units such as data packets or data frames are disclosed that provide improved system performance and more efficient use of system resources. In accordance with the disclosed systems and methods, each data unit includes a transaction ID tag field containing information that defines at least one tag value for use in determining a destination address for the data unit. The disclosed systems and methods employ memory mapping approaches in conjunction with the transaction ID tag fields from the respective data units to assign each tag value, or at least one range of tag values, to a specified address, or at least one range of specified addresses, for locations in internal memory that store corresponding transaction parameters. In addition, the disclosed systems and methods can apply selected bits from the transaction ID tag fields to selector inputs of one or more multiplexor components for selecting corresponding transaction parameters provided at data inputs of the multiplexor components. The disclosed systems and methods may be employed in memory-read data transfer transactions to access or otherwise recover the transaction parameters necessary to determine the destination addresses for memory locations where the memory-read data are to be transmitted (or "written").

In accordance with one aspect, a system for routing data units such as data packets or data frames includes a data routing component, a first memory (also referred to herein as the "internal memory"), a second memory (also referred to herein as the "system memory"), a PCIe interface, and a local bus. In accordance with an exemplary aspect of the disclosed system, the local bus may be implemented as a PCIe bus, a PCI bus, or any other suitable type of bus. In accordance with another exemplary aspect, the data routing component may be implemented as a DMA processing engine, a bus-bridge, a bus master, a processor such as a central processing unit (CPU), a microprocessor, or a microcontroller, or any other suitable component or device capable of actively initiating a data transaction. The PCIe interface is communicably connected to the data routing component by a first pair of PCIe links (TX/RX; collectively referred to herein as the "first PCIe lane"), and to the local bus by a second pair of PCIe links (TX/RX; collectively referred to herein as the "second PCIe lane"). The PCIe interface is also communicably connectable to a host device by a third pair of PCIe links (TX/RX; collectively referred to herein as the "third PCIe lane"). The data routing component is communicably connected to the local bus by a fourth pair of PCIe links (collectively referred to herein as the "fourth PCIe lane"), and to the internal memory. In addition, the system memory is communicably connected to the local bus by a fifth pair of PCIe links (collectively referred to herein as the "fifth PCIe lane"). In accordance with a further exemplary aspect, the disclosed system for routing data units further includes at least one multiplexor component in place of, or in addition to, the internal memory.

In accordance with an exemplary mode of operation, the disclosed system for routing data units may be employed in a memory-read data transfer transaction from the host device to the system memory using the data routing component. In accordance with an exemplary aspect, the disclosed system employs memory mapping approaches in conjunction with the transaction ID tag fields from the respective data units to assign each tag value obtained from the transaction ID tag fields to a specified address for a location in the internal memory that stores a corresponding transaction parameter, which is represented by a string of bits. In accordance with another exemplary aspect, the data routing component stores the transaction parameters in the internal memory. In accordance with still another exemplary aspect, each transaction parameter stored in the internal memory defines at least a part of a destination address for a location in the system memory where the memory-read data are to be written. In accordance with this exemplary mode of operation, the data routing component prepares a memory-read request data packet, and transmits the memory-read request data packet to the host device through the PCIe interface over the first and third PCIe lanes. In response to receiving the memory-read request data packet, the host device transmits at least one completion data packet containing the memory-read data over the third PCIe lane to the PCIe interface, which forwards the completion data packet to the data routing component over the first PCIe lane. The data routing component receives the completion data packet, and accesses information defined by the tag value contained in the transaction ID tag field embedded in the completion data packet to obtain the specified address for the location in the internal memory that stores the corresponding transaction parameter. In accordance with yet another exemplary aspect, the transaction ID tag field includes at least an upper bit field and a lower bit field, and the address for the location in the internal memory is specified by the information contained in at least one of the upper and lower bit fields. The data routing component recovers the transaction parameter stored at the specified address of the internal memory for use in determining the destination address for the location in the system memory where the memory-read data are to be written. The data routing component performs a memory-write data transfer via the local bus over the fourth and fifth PCIe lanes to store the memory-read data in the location of the system memory specified by the destination address.

In accordance with another exemplary mode of operation, the data routing component applies selected bits from the transaction ID tag fields embedded in the completion data packets to selector inputs of the multiplexor component for selecting the corresponding transaction parameters provided at data inputs of the multiplexor component. In accordance with an exemplary aspect, the data routing component stores each of the transaction parameters in a multi-bit storage location accessible at a respective one of the data inputs of the multiplexor component. In accordance with another exemplary aspect, the data routing component applies the bits from the lower bit field of each transaction ID tag field to the selector inputs of the multiplexor component to select the corresponding transaction parameter, which defines at least a part of the destination address for the location in the system memory where the memory-read data are to be written. In accordance with still another exemplary aspect, the data routing component concatenates the bits from the upper bit field to the string of bits representing the transaction parameter to form the destination address. In accordance with a further exemplary aspect, the data routing component concatenates a predetermined variable or fixed partial address to the string of bits representing the transaction parameter to form the destination address. For example, such a predetermined variable or fixed partial address may be stored in the upper bit field of the transaction ID tag field. The data routing component performs a memory-write data transfer via the local bus over the fourth and fifth PCIe lanes to store the memory-read data in the location of the system memory specified by the destination address.

By employing memory mapping approaches in conjunction with transaction ID tag fields from data units such as data packets or data frames to obtain transaction parameters that define destination addresses for memory locations where memory-read data are to be written, the routing of such data units can be performed in a manner that provides improved system performance and more efficient use of system resources.

Other features, functions, and aspects of the invention will be evident from the Drawings and/or the Detailed Description of the Invention that follow.

BRIEF DESCRIPTION OF THE SEVERAL VIEWS OF THE DRAWINGS

The invention will be more fully understood with reference to the following Detailed Description of the Invention in conjunction with the drawings of which.

DETAILED DESCRIPTION OF THE INVENTION

Systems and methods of routing data units such as data packets or data frames are disclosed that provide improved system performance and more efficient use of system resources as compared to conventional approaches. In accordance with the disclosed systems and methods, memory mapping approaches are employed in conjunction with transaction ID tag fields from the respective data units to assign a tag value, or at least one range of tag values, to a specified address, or at least one range of specified addresses, for locations in internal memory that store corresponding transaction parameters. In further accordance with the disclosed systems and methods, selected bits from the transaction ID tag fields can be applied to selector inputs of one or more multiplexor components for selecting corresponding transaction parameters provided at data inputs of the multiplexor components. The disclosed systems and methods may be employed in memory-read data transfer transactions to access or otherwise recover the transaction parameters necessary to determine destination addresses for memory locations where the memory-read data are to be transmitted (or "written").

Figure 1:
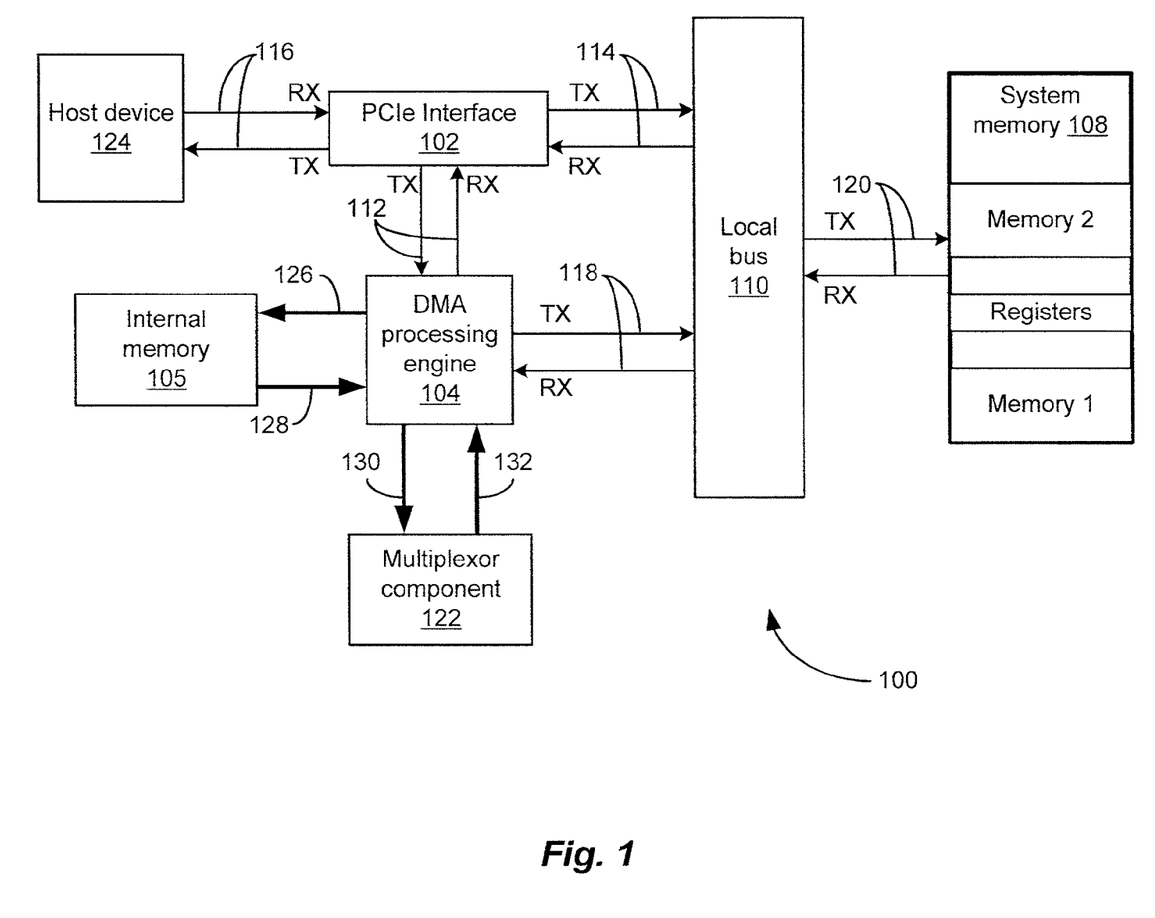
FIG. 1 is a block diagram of an exemplary system for routing data units, including an exemplary internal memory and an exemplary multiplexor component, according to an exemplary embodiment of the present application.

FIG. 1 depicts an illustrative embodiment of a system 100 for routing data units, in accordance with the present application. As shown in FIG. 1, the system 100 includes a DMA processing engine 104, a first memory 105 (also referred to herein as the "internal memory 105"), a second memory 108 (also referred to herein as the "system memory 108"), a PCIe interface 102, and a local bus 110.

For example, the system 100 may be operative to route data packets, data frames, or any other suitable types of data units. Further, the local bus 110 may be implemented as a PCIe bus, a PCI bus, or any other suitable type of bus. The PCIe interface 102 is communicably connected to the DMA processing engine 104 by a first pair of PCIe links 112 (TX/RX; collectively referred to herein as the "first PCIe lane 112"), and to the local bus 110 by a second pair of PCIe links 114 (TX/RX; collectively referred to herein as the "second PCIe lane 114"). The PCIe interface 102 is also communicably connected to a host device 124 by a third pair of PCIe links 116 (TX/RX; collectively referred to herein as the "third PCIe lane 116"). The DMA processing engine 104 is communicably connected to the local bus 110 by a fourth pair of PCIe links 118 (TX/RX; collectively referred to herein as the "fourth PCIe lane 118"), and to the internal memory 105 by links 126, 128. In addition, the system memory 108 is communicably connected to the local bus 110 by a fifth pair of PCIe links 120 (TX/RX; collectively referred to herein as the "fifth PCIe lane 120"). The system 100 can optionally further include at least one multiplexor component 122 in place of, or in addition to, the internal memory 105, in which case the DMA processing engine 104 is communicably connected to the multiplexor component 122 by links 130, 132, such as is shown in FIG. 1.

In further accordance with the illustrative embodiment of FIG. 1, the system 100 can be configured to employ the PCIe system protocol to implement memory-read data transfer transactions from the host device 124 to the system memory 108 utilizing a transaction ID-based data packet routing mechanism. For example, the system memory 108 may contain a first plurality of memory locations ("Memory 1") corresponding to a first exemplary range of memory addresses, 0000_0000h through 0100_0000h, a second plurality of memory locations ("Memory 2") corresponding to a second exemplary range of memory addresses, F000_0000h through F010_0000h, and a third plurality of memory locations ("Registers") corresponding to a third exemplary range of memory addresses, 1000_0000h through 1001_0000h. Further, each transaction ID is a 24-bit wide field embedded in a data packet that includes a 5-bit tag field (extendible to 8 bits) containing information that defines at least one tag value for use in recovering, from the internal memory 105, at least one transaction parameter, which, in turn, can be used to determine at least one destination address for at least one location in the system memory 108 where the memory-read data are to be written. For example, the DMA processing engine 104 may store the transaction parameters in the internal memory 105.

Figure 2:
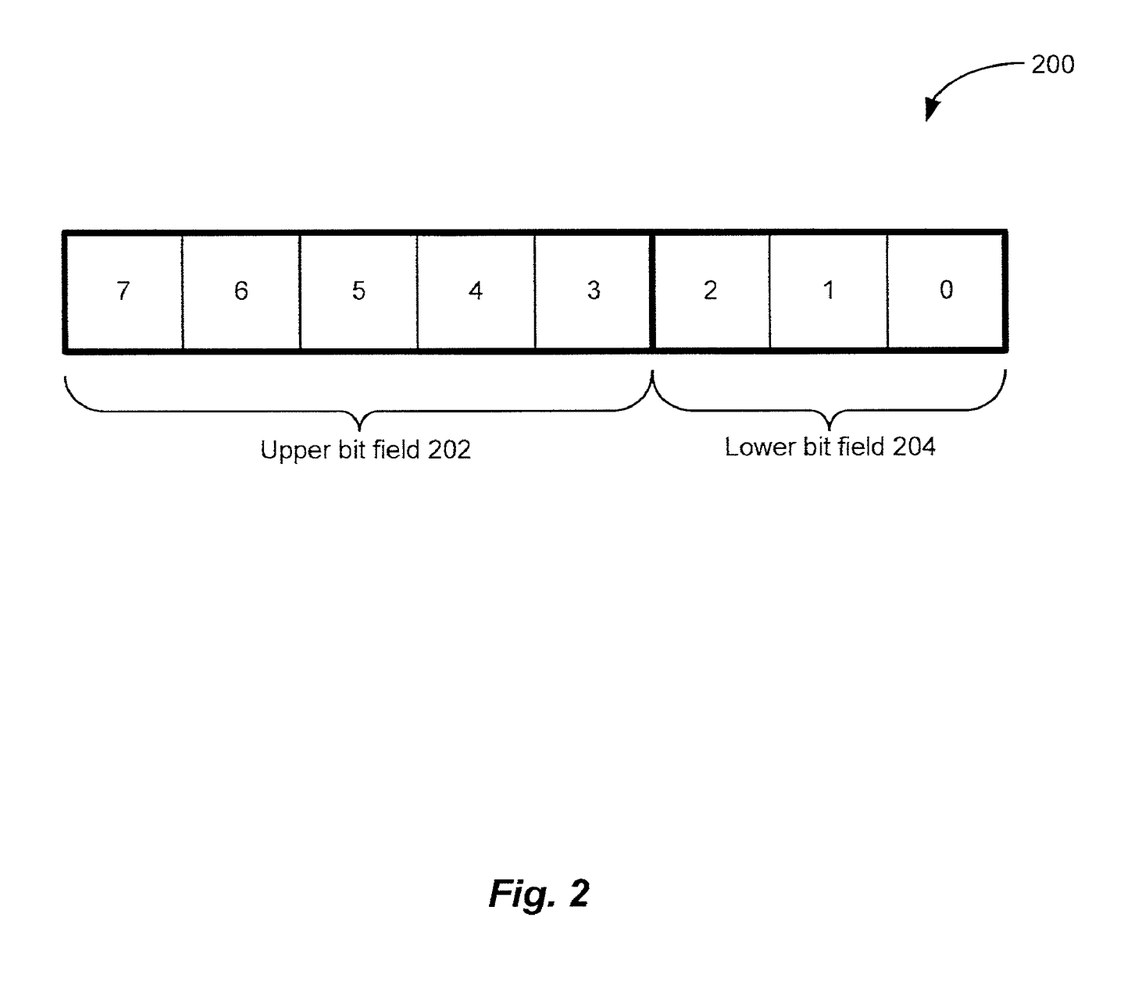
FIG. 2 is a diagram of an exemplary transaction ID tag field utilized by the system of FIG. 1.

FIG. 2 depicts an exemplary transaction ID tag field 200 utilized by the system 100 of FIG. 1. As shown in FIG. 2, the transaction ID tag field 200 is an extended 8-bit wide field that includes an upper bit field 202 and a lower bit field 204. For example, the upper bit field 202 may be 5 bits wide or any other suitable width, and the lower bit field 204 may be 3 bits wide or any other suitable width. In accordance with such an embodiment, the lower bit field 204 includes three bit storage locations 0, 1, 2 for storing three bits defining one predetermined tag value, and the upper bit field 202 includes five bit storage locations 3, 4, 5, 6, 7 that can be used to store five bits defining another predetermined tag value.

In accordance with the present application, the system 100 employs memory mapping approaches in conjunction with transaction ID tag fields, such as the transaction ID tag field 200, to assign each predetermined tag value obtained from the respective transaction ID tag fields to a specified address for a location in the internal memory 105 that stores a corresponding transaction parameter. In further accordance with the present application, each transaction parameter stored in the internal memory 105 defines at least a part of a destination address for a location in the system memory 108 where the memory-read data are to be written.

Referring again to FIG. 1, and in accordance with an exemplary mode of operation of the system 100, the DMA processing engine 104 is operative to prepare a memory-read request data packet for requesting memory-read data from the host device 124, and to transmit the memory-read request data packet to the host device through the PCIe interface 102 over the first and third PCIe lanes 112, 116. In response to receiving the memory-read request data packet, the host device 124 transmits at least one completion data packet containing the requested memory-read data over the third PCIe lane 116 to the PCIe interface 102, which forwards each completion data packet to the DMA processing engine 104 over the first PCIe lane 112. For each completion data packet it receives, the DMA processing engine 104 accesses information defined by at least one tag value contained in the transaction ID tag field 200 embedded in the completion data packet to obtain the specified address for the location in the internal memory 105 that stores the corresponding transaction parameter. It is noted that the tag value contained in the transaction ID tag field 200 (see FIG. 2) embedded in the completion data packet is unique to the memory-read request issued by the DMA processing engine 104. In accordance with this exemplary mode of operation, the address for the location in the internal memory 105 is specified by the information contained in at least one of the upper and lower bit fields 202, 204 (see FIG. 2). The DMA processing engine 104 recovers the transaction parameter stored at that specified address of the internal memory 105, and uses the transaction parameter to determine the destination address for the location in the system memory 108 where the memory-read data are to be written. The DMA processing engine 104 performs a memory-write data transfer via the local bus 110 over the fourth and fifth PCIe lanes 118, 120 to store the memory-read data in the location of the system memory 108 specified by the destination address, thereby completing the memory-read data transfer transaction. It is noted that the tag value employed in the now completed memory-read data transfer transaction described above may be reused in one or more subsequent memory-read/write data transfer transactions.

In accordance with another exemplary mode of operation of the system 100, the DMA processing engine 104 applies selected bits from the transaction ID tag field 200 embedded in each completion data packet to selector inputs 1-N of a multiplexor 421 (see FIG. 4) within the multiplexor component 122 for selecting the corresponding transaction parameters 1-M provided at data inputs 1-M, respectively, to the multiplexor 421. For example, the DMA processing engine 104 may store each of the transaction parameters in a multi-bit storage location accessible at a respective one of the data inputs 1-M to the multiplexor 421. In accordance with this exemplary mode of operation, the DMA processing engine 104 applies the bits from the lower bit field 204 of the transaction ID tag field 200 to the selector inputs 1-N of the multiplexor 421 to select the corresponding transaction parameter, which defines at least a part of the destination address for the location in the system memory 108 where the memory-read data are to be written.

In accordance with still another exemplary mode of operation of the system 100, the DMA processing engine 104 concatenates the bits from the upper bit field 202 to a string of bits representing the transaction parameter to form the destination address. In accordance with a still further exemplary mode of operation of the system 100, the DMA processing engine 104 concatenates a predetermined variable or fixed partial address to the string of bits representing the transaction parameter to form the destination address. For example, such a predetermined variable or fixed partial address may be stored in the upper bit field 202 of the transaction ID tag field 200. Further, the bits from the upper bit field 202, which can be used to form a predetermined variable or fixed partial address, may be employed to define a specified region within the system memory 108, and some or all of the string of bits representing the transaction parameter may be employed to define a particular location within that specified region of the system memory 108. The DMA processing engine 104 performs a memory-write data transfer via the local bus 110 over the fourth and fifth PCIe lanes 118, 120 to store the memory-read data in the location of the system memory 108 specified by the destination address.

Figure 3:
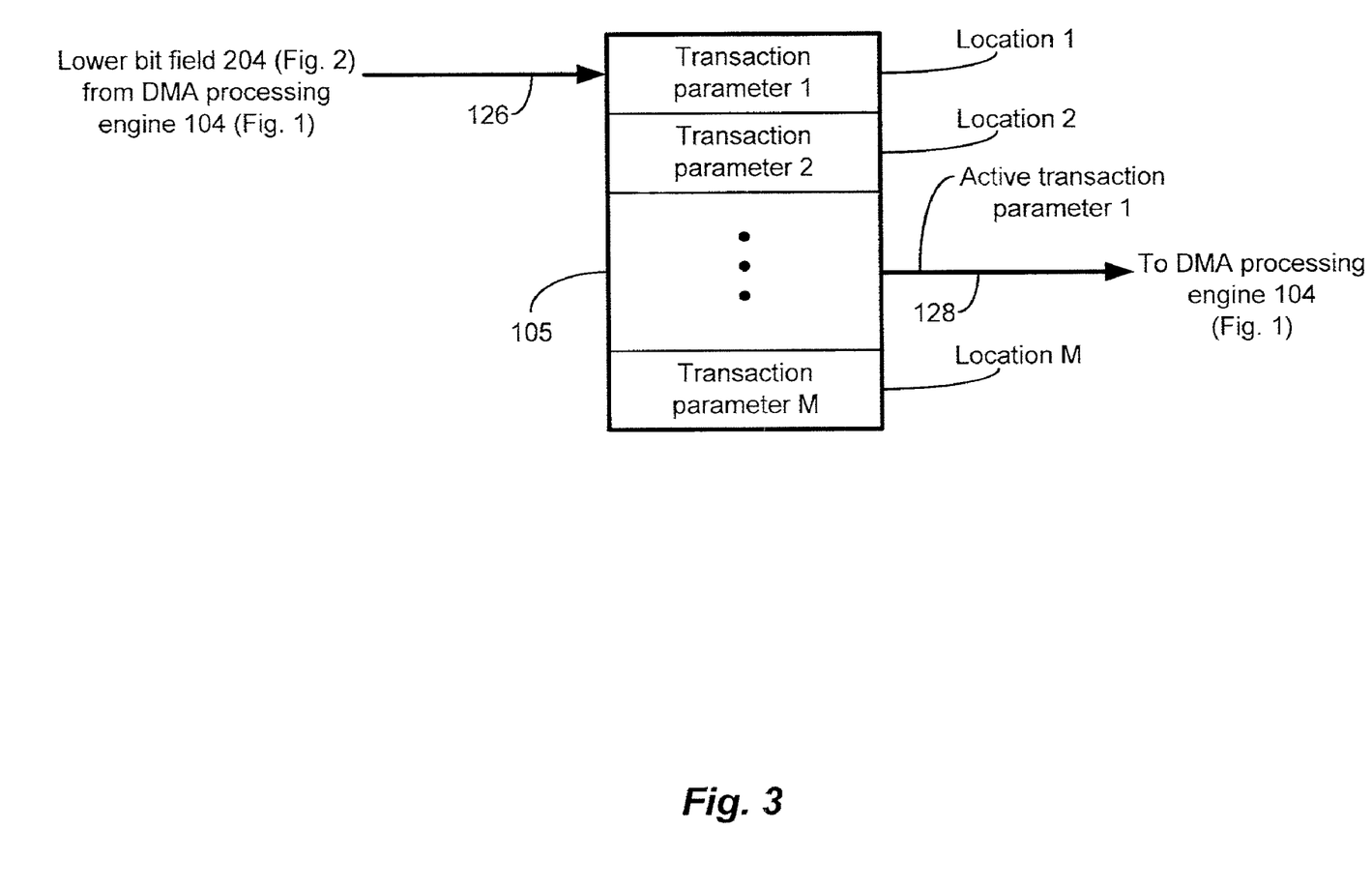
FIG. 3 is a block diagram illustrating exemplary use of the transaction ID tag field of FIG. 2, for accessing or otherwise recovering an exemplary transaction parameter from the internal memory of FIG. 1.

The disclosed systems and methods of routing data units of the present application will be further understood with reference to the following illustrative, non-limiting examples, and in FIGS. 1 through 5. In a first illustrative example, the system 100 (see FIG. 1) is employed in a memory-read data transfer transaction from the host device 124 to the system memory 108 using the DMA processing engine 104 and the internal memory 105. FIG. 3 depicts a conceptual view of the internal memory 105, in accordance with this first illustrative example. As shown in FIG. 3, the internal memory 105 includes a plurality of memory locations 1-M configured to store a plurality of transaction parameters 1-M, respectively. For example, the internal memory 105 may include 8 memory locations for storing 8 transaction parameters, respectively, or any other suitable number of memory locations for storing any other suitable number of transaction parameters. Further, each of the transaction parameters 1-M may be represented by a string of bits that is 16 bits in length, 32 bits in length, or any other suitable length. Each transaction parameter 1-M provides information such as routing information, an address for a location in memory, or any other suitable information for use in or in furtherance of routing a data unit such as a data packet or a data frame. In further accordance with this first illustrative example, the lower bit field 204 of the transaction ID tag field 200 (see FIG. 2) contains 3 bits defining a predetermined tag value assigned to a specified address for a location in the internal memory 105 that stores a corresponding transaction parameter. In this first illustrative example, the lower bit field 204 contains three logical low bits 0, 0, 0 stored in the bit storage locations 0, 1, 2, respectively, of the transaction ID tag field 200. These three logical low bits 0, 0, 0 in the lower bit field 204 define a predetermined tag value of "0", which is assigned to the address for the location 1 in the internal memory 105 storing the transaction parameter 1.

Still in accordance with the first illustrative example, the DMA processing engine 104 prepares a memory-read request data packet for requesting memory-read data from the host device 124, and transmits the memory-read request data packet to the host device 124 through the PCIe interface 102 over the first and third PCIe lanes 112, 116. The memory-read request data packet has the transaction ID tag field 200 embedded therein that includes the lower bit field 204 containing the predetermined tag value of "0" assigned to the address for the location 1 in the internal memory 105. In response to receiving the memory-read request data packet, the host device 124 transmits a completion data packet containing the requested memory-read data over the third PCIe lane 116 to the PCIe interface 102, which forwards the completion data packet over the first PCIe lane 112 to the DMA processing engine 104 Like the memory-read request data packet, the completion data packet has the transaction ID tag field 200 embedded therein that includes the lower bit field 204 containing the predetermined tag value of "0". The DMA processing engine 104 receives the completion data packet from the host device 124, and accesses the predetermined tag value of "0" from the lower bit field 204 of the transaction ID tag field 200. Further, the DMA processing engine 104 applies, over the link 126, the 3 bits from the lower bit field 204 defining the predetermined tag value of "0" to the internal memory 105 to address the location 1 in the internal memory 105, thereby recovering, over the link 128, the transaction parameter 1 (also referred to herein as the "active transaction parameter 1") stored at that memory location. For example, the internal memory 105 may provide the string of bits representing the active transaction parameter 1 to the DMA processing engine 104 over the link 128 in a serial or parallel fashion.

Also in accordance with this first illustrative example, the active transaction parameter 1 defines the full destination address for a location in the system memory 108 where the requested memory-read data are to be written. For example, if the local bus 110 is implemented as a local PCIe bus, then the active transaction parameter 1 defines the full 32-bit destination address for writing the memory-read data into the corresponding location in system memory 108 over the local PCIe bus. The DMA processing engine 104 performs a memory-write data transfer via the local bus 110 over the fourth and fifth PCIe lanes 118, 120 to store the memory-read data in the location of the system memory 108 specified by the destination address.

Figure 4:
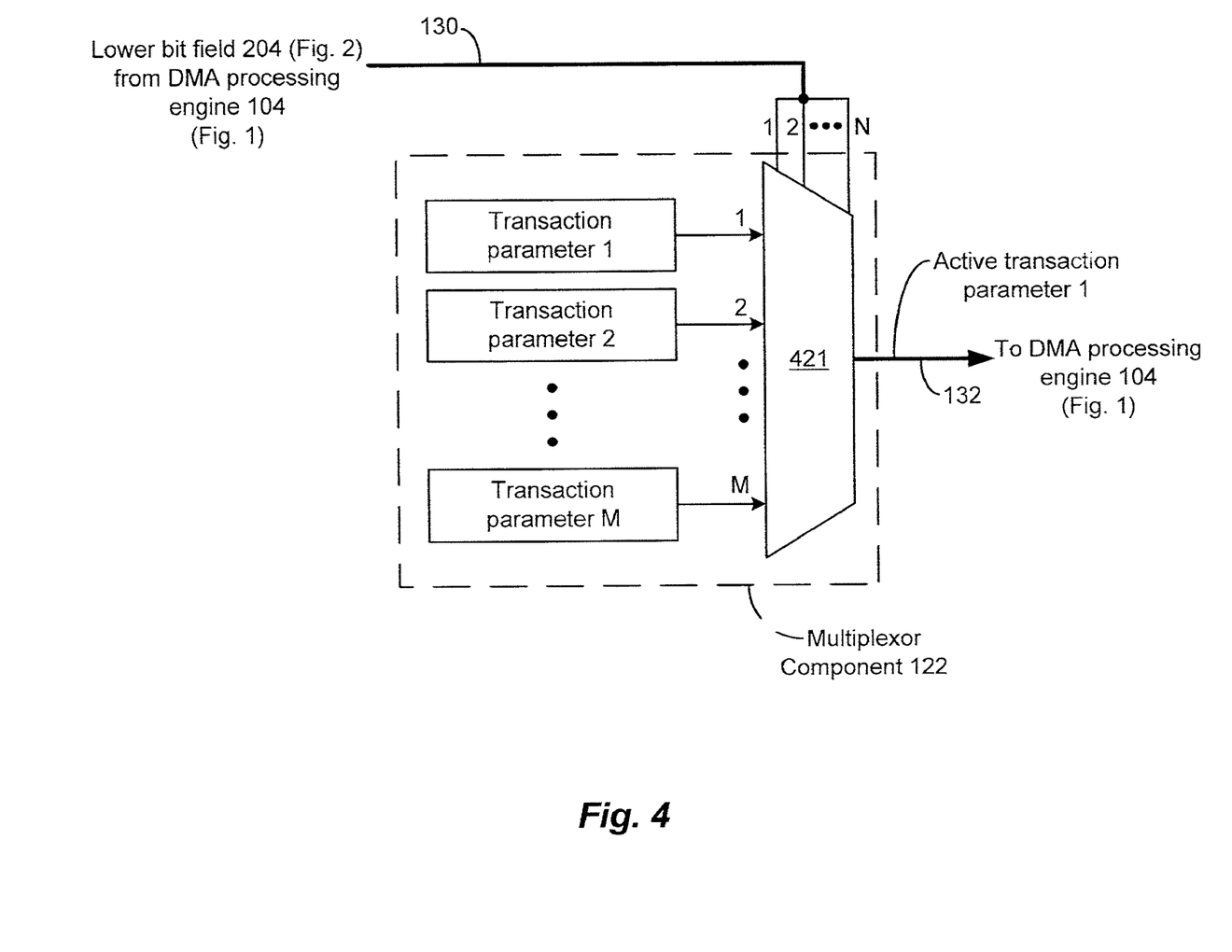
FIG. 4 is a block diagram illustrating another exemplary use of the transaction ID tag field of FIG. 2, for accessing or otherwise recovering an exemplary transaction parameter using the multiplexor component of FIG. 1.

In accordance with a second illustrative example of the present application, the system 100 is employed in a memory-read data transfer transaction from the host device 124 to the system memory 108 using the DMA processing engine 104 and the multiplexor component 122. FIG. 4 depicts a conceptual view of the multiplexor component 122, in accordance with this second illustrative example. As shown in FIG. 4, the 3 bits from the lower bit field 204 of the transaction ID tag field 200 are applied, over the link 130, to the selector inputs 1-N (N=3) of the multiplexor 421 within the multiplexor component 122 for selecting a corresponding one of the transaction parameters 1-M (M=8) provided at the data inputs 1-M (M=8) to the multiplexor 421. For example, the strings of bits representing the transaction parameters 1-M may be provided to the respective data inputs 1-M in a serial fashion. Further, the multiplexor 421 may have 8 data inputs for receiving 8 transaction parameters, respectively, and 3 selector inputs for use in selecting the 8 transaction parameters, or any other suitable numbers of data inputs 1-M and selector inputs 1-N. Moreover, as in the first illustrative example described herein, each of the transaction parameters 1-M provided at the respective data inputs 1-M of the multiplexor 421 may be represented by a string of bits that is 16 bits in length, 32 bits in length, or any other suitable length. In addition, the lower bit field 204 of the transaction ID tag field 200 contains 3 bits defining a predetermined tag value corresponding to one of the transaction parameters 1-M (M=8). In this second illustrative example, the lower bit field 204 contains three "0" bits defining a predetermined tag value of "0", which corresponds to the transaction parameter 1 provided at the data input 1 to the multiplexor 421.

In accordance with the second illustrative example, the DMA processing engine 104 prepares a memory-read request data packet for requesting memory-read data from the host device 124, and transmits the memory-read request data packet to the host device 124 through the PCIe interface 102 over the first and third PCIe lanes 112, 116. The memory-read request data packet has the transaction ID tag field 200 embedded therein that includes the lower bit field 204 containing the predetermined tag value of "0" corresponding to the transaction parameter 1 provided at the data input 1 to the multiplexor 421. In response to receiving the memory-read request data packet, the host device 124 transmits a completion data packet containing the requested memory-read data over the third PCIe lane 116 to the PCIe interface 102, which forwards the completion data packet over the first PCIe lane 112 to the DMA processing engine 104 Like the memory-read request data packet, the completion data packet has the transaction ID tag field 200 embedded therein that includes the lower bit field 204 containing the predetermined tag value of "0". The DMA processing engine 104 receives the completion data packet from the host device 124, and accesses the predetermined tag value of "0" from the lower bit field 204 of the transaction ID tag field 200. Further, the DMA processing engine 104 applies the 3 bits from the lower bit field 204 defining the predetermined tag value of "0" to the selector inputs 1-N (N=3) of the multiplexor 421 to recover the transaction parameter 1 (the "active transaction parameter 1") provided at the data input 1 to the multiplexor 421. Also in accordance with this second illustrative example, the multiplexor component 122 provides the bits representing the active transaction parameter 1 to the DMA processing engine 104 over the link 132 in a serial fashion.

In further accordance with this second illustrative example, the active transaction parameter 1 defines the full destination address for a location in the system memory 108 where the requested memory-read data are to be written. For example, if the local bus 110 is implemented as a local PCIe bus, then the active transaction parameter 1 defines the full 32-bit destination address for writing the memory-read data into the corresponding location in system memory 108 over the local PCIe bus. The DMA processing engine 104 performs a memory-write data transfer via the local bus 110 over the fourth and fifth PCIe lanes 118, 120 to store the memory-read data in the location of the system memory 108 specified by the destination address.

Figure 5:
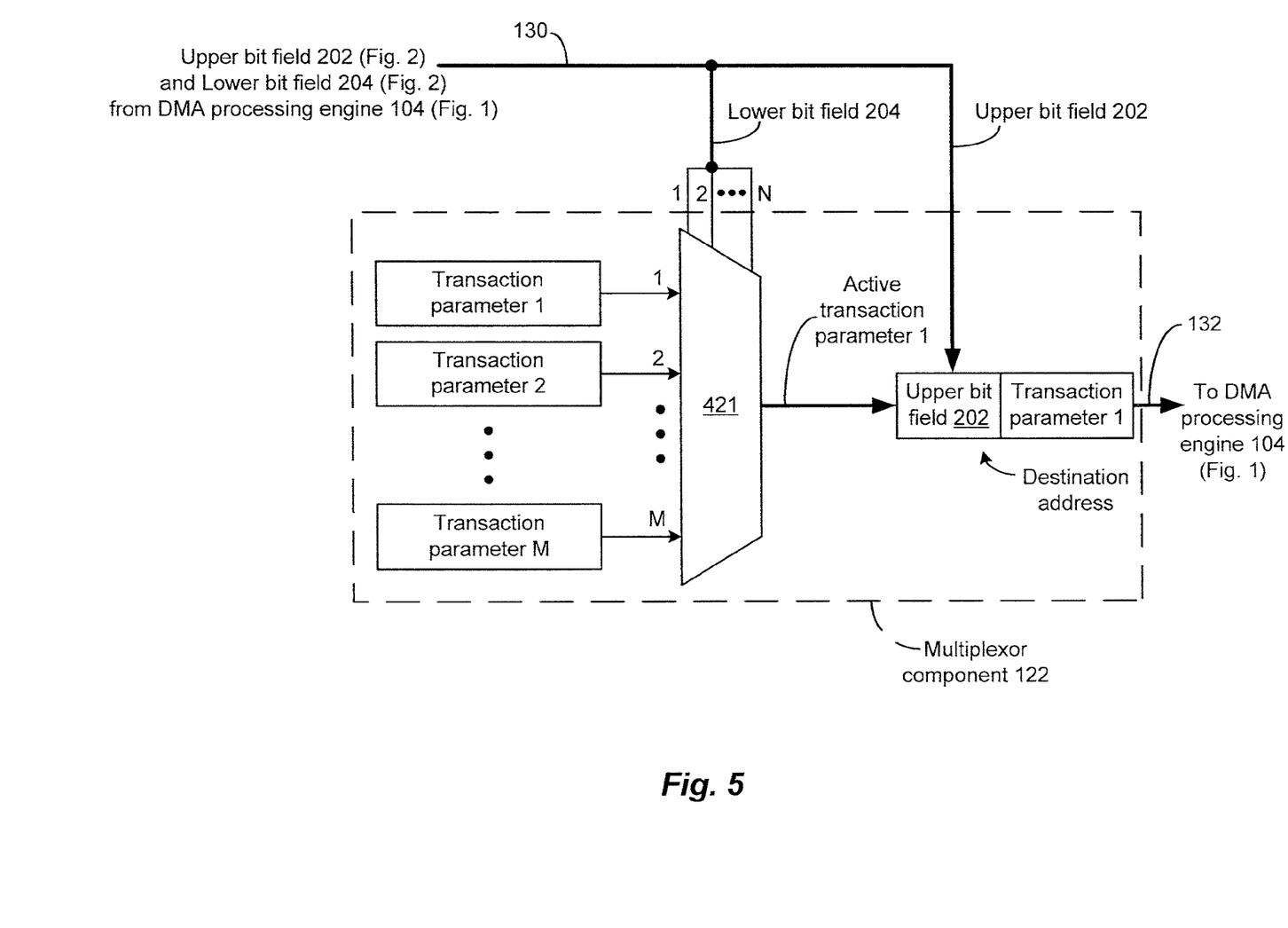
FIG. 5 is a block diagram illustrating yet another exemplary use of the transaction ID tag field of FIG. 2, for accessing or otherwise recovering an exemplary transaction parameter using the multiplexor component of FIG. 1.

In accordance with a third illustrative example of the present application, the system 100 is employed in a memory-read data transfer transaction from the host device 124 to the system memory 108, again using the DMA processing engine 104 and the multiplexor component 122. FIG. 5 depicts a conceptual view of the multiplexor component 122, in accordance with this third illustrative example. As shown in FIG. 5, the 3 bits from the lower bit field 204 of the transaction ID tag field 200 are applied, over the link 130, to the selector inputs 1-N (N=3) of the multiplexor 421 within the multiplexor component 122 for selecting a corresponding one of the transaction parameters 1-M (M=8) provided at the data inputs 1-M (M=8), respectively, to the multiplexor 421. In this third illustrative example, the bits from the upper bit field 202 of the transaction ID tag field 200 are applied, over the link 130, to the multiplexor component 122, and concatenated to the string of bits representing the corresponding transaction parameter to form the destination address.

Further, the lower bit field 204 contains three "0" bits defining a predetermined tag value of "0", which corresponds to the transaction parameter 1 provided at the data input 1 to the multiplexor component 122.

In accordance with the third illustrative example, the DMA processing engine 104 prepares a memory-read request data packet for requesting memory-read data from the host device 124, and transmits the memory-read request data packet to the host device 124 through the PCIe interface 102 over the first and third PCIe lanes 112, 116. The memory-read request data packet has the transaction ID tag field 200 embedded therein that includes the lower bit field 204 containing the predetermined tag value of "0" corresponding to the transaction parameter 1 provided at the data input 1 to the multiplexor 421. In response to receiving the memory-read request data packet, the host device 124 transmits a completion data packet containing the requested memory-read data over the third PCIe lane 116 to the PCIe interface 102, which forwards the completion data packet over the first PCIe lane 112 to the DMA processing engine 104 Like the memory-read request data packet, the completion data packet has the transaction ID tag field 200 embedded therein that includes the lower bit field 204 containing the predetermined tag value of "0". The DMA processing engine 104 receives the completion data packet from the host device 124, and accesses the predetermined tag value of "0" from the lower bit field 204 of the transaction ID tag field 200. Further, the DMA processing engine 104 applies the 3 bits from the lower bit field 204 defining the predetermined tag value of "0" to the selector inputs 1-N (N=3) of the multiplexor 421 to recover the transaction parameter 1 (the "active transaction parameter 1") provided at the data input 1 to the multiplexor 421. In addition, the DMA processing engine 104 accesses another predetermined tag value, having any suitable value, from the upper bit field 202 of the transaction ID tag field 200, and concatenates the 5 bits from the upper bit field 202 defining the other predetermined tag value to the string of bits representing the active transaction parameter 1, thereby forming the destination address. In accordance with this third illustrative example, the 5 bits from the upper bit field 202 concatenated to the string of bits representing the active transaction parameter 1 define the full destination address for a location in the system memory 108 where the requested memory-read data are to be written. For example, if the local bus 110 is implemented as a local PCIe bus, then the 5 bits from the upper bit field 202 concatenated to the string of bits representing the active transaction parameter 1 define the full 32-bit destination address for writing the memory-read data into the corresponding location in system memory 108 over the local PCIe bus. The DMA processing engine 104 performs a memory-write data transfer via the local bus 110 over the fourth and fifth PCIe lanes 118, 120 to store the memory-read data in the location of the system memory 108 specified by the destination address.

Figure 6:
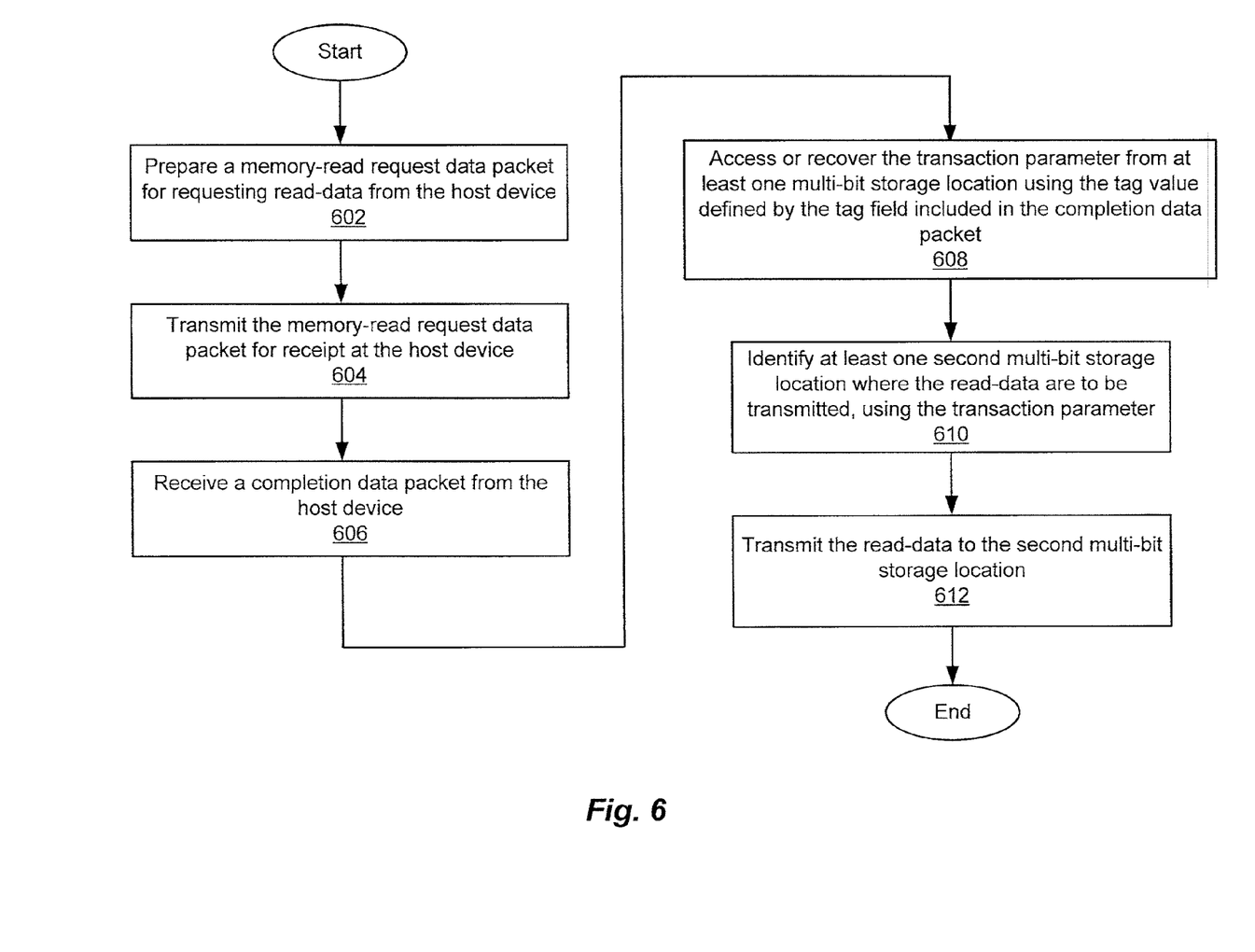
FIG. 6 is a flow diagram illustrating an exemplary method of operating the system of FIGS. 1.

An exemplary method of operating the disclosed system 100 for routing data units in a memory-read data transfer transaction is described herein with reference to FIGS. 1 and 6. As shown in FIG. 6, a memory-read request data packet for requesting read-data from the host device 124 is prepared by the DMA processing engine 104, as depicted in step 602. The memory-read request data packet includes a tag field defining at least one tag value, which corresponds to at least one transaction parameter. As shown in step 604, the memory-read request data packet is transmitted by the DMA processing engine 104 for receipt at the host device 124. As shown in step 606, a completion data packet is received at the DMA processing engine 104 from the host device 124. The completion data packet includes the requested read-data, and the tag field defining the at least one tag value. As shown in step 608, the transaction parameter is accessed or otherwise recovered from at least one first multi-bit storage location by the DMA processing engine 104, using the tag value defined by the tag field included in the completion data packet. For example, the first multi-bit storage location may be contained within the internal memory 105 (see FIGS. 1 and 3), or may be operatively coupled to one or more of the data inputs 1-M to the multiplexor 421 (see FIGS. 4 and 5). As depicted in step 610, at least one second multi-bit storage location where the read-data are to be transmitted is identified by the DMA processing engine 104, using the transaction parameter. For example, the second multi-bit storage location may be contained within the system memory 108 of the system 100. As depicted in step 612, the read-data is transmitted to the second multi-bit storage location by the DMA processing engine 104.

Having described the above illustrative embodiments of the disclosed systems and methods of routing data units, it is noted that other alternative embodiments or variations may be made/practiced. For example, it was described herein that the system 100 (see FIG. 1) includes a DMA processing engine 104. In accordance with one or more alternative embodiments of the disclosed systems and methods of routing data units, the DMA processing engine 104 of FIG. 1 may be replaced by a bus-bridge, a bus master, a processor such as a central processing unit (CPU), a microprocessor, or a microcontroller, or any other suitable component or device capable of actively initiating a data transaction.

Figure 7A:
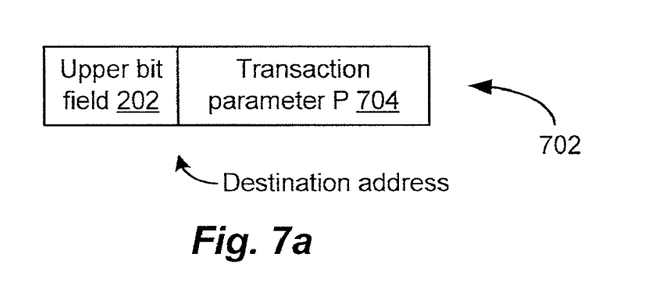
FIGS. 7a-7d are diagrams of exemplary destination addresses formed using the transaction ID tag field of FIG. 2 and the multiplexor component of FIG. 1.
Figure 7B:
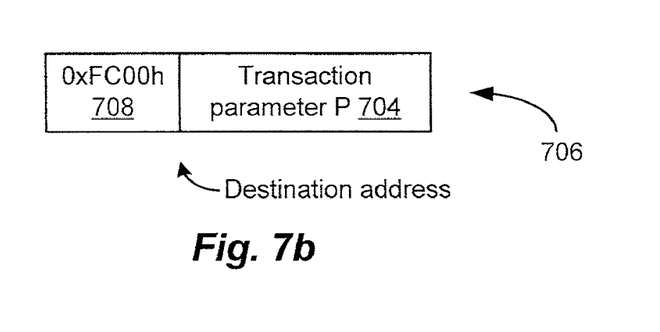

It was further described herein that an active transaction parameter recovered from the internal memory 105, or selected using the multiplexor component 122, may define the full destination address for a location in the system memory 108 where requested read-data are to be written. It was also described herein that the bits from the upper bit field 202 of the transaction ID tag field 200, which can be used to form a predetermined variable or fixed partial address, may be concatenated to the string of bits representing the transaction parameter to form the destination address. FIG. 7a depicts an exemplary destination address bit field 702, including the upper bit field 202 concatenated to a bit field 704 containing a string of bits representing an exemplary transaction parameter P, thereby forming the full destination address. Further, FIG. 7b depicts an exemplary destination address bit field 706, including a bit field 708 containing an exemplary fixed partial address, 0xFC00h, concatenated to the bit field 704 containing the string of bits representing the exemplary transaction parameter P. For example, the bit field 708 containing the exemplary fixed partial address, 0xFC00h, or any other suitable fixed partial address, may be hard-coded or configurable within the system 100.

Figure 7C:
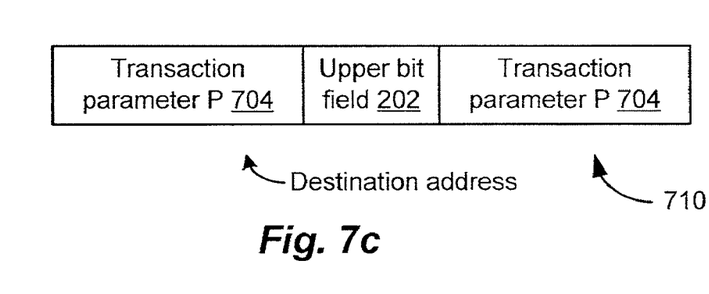
Figure 7D:
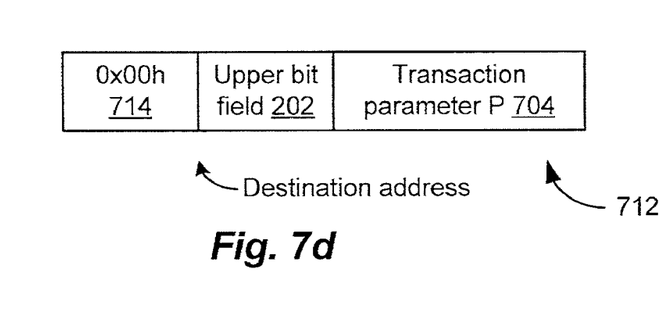

In accordance with one or more alternative embodiments of the disclosed systems and methods of routing data units, the DMA processing engine 104 is operative to concatenate to one another the bits from the upper bit field 202 of the transaction ID tag field 200, another string of bits representing a predetermined variable or fixed partial address, the string of bits representing the exemplary transaction parameter P, and/or any other suitable bit fields or strings of bits, in any other suitable arrangement or combination, to form the full destination address for a location in the system memory 108 where requested read-data are to be written. For example, FIG. 7c depicts an exemplary destination address bit field 710, including the bit field 704 containing the string of bits representing the exemplary transaction parameter P concatenated to the upper bit field 202, which, in turn, is concatenated to a duplicate of the bit field 704 containing the string of bits representing the exemplary transaction parameter P, thereby forming the full destination address. Further, FIG. 7d depicts an exemplary destination address bit field 712, including a bit field 714 containing an exemplary fixed partial address, 0x00h, concatenated to the upper bit field 202, which, in turn, is concatenated to the bit field 704 containing the string of bits representing the exemplary transaction parameter P, thereby forming the full destination address.

It was further described herein that, in a memory-read data transfer transaction, each transaction ID contains information that defines at least one tag value for use in recovering, from the internal memory 105, at least one transaction parameter, which, in turn, can be used to determine at least one destination address for at least one location in the system memory 108 where memory-read data are to be written. In accordance with one or more alternative embodiments, a plurality of tag values can be assigned to a plurality of groups (each group also referred to herein as a "tag slot"), in which each tag slot has one or more unique tag values assigned to it. Further, each of the plurality of tag slots can be assigned to a specific destination address for a location in the system memory 108 where memory-read data are to be written.

Accordingly, in a memory-read data transfer transaction requiring memory-read data be written to a location in the system memory 108 having a specific destination address, a unique tag value for use in making the transaction may be selected from the tag slot assigned to that specific destination address, and that tag slot may be marked "unavailable," thereby prohibiting any of the other tag values assigned to that tag slot from being used while the current memory-read data transfer transaction is in progress. Further, after the memory-read data transfer transaction has been completed, that tag slot may be marked "available," thereby allowing any of the tag values assigned to that tag slot to be used again in a subsequent memory-read data transfer transaction. In this way, the disclosed systems and methods may be configured to employ any desired subset or subsets of tag values for implementing any desired total number of memory-read data transfer transactions.

It will be appreciated by those of ordinary skill in the art that one or more of the functions necessary to implement the above-described systems and methods of routing data units can be embodied—in whole or in part—in hardware, software, or some suitable combination of hardware and software, using programmable micro-controllers, microprocessors, digital signal processors, and/or logic arrays, read-only memory (ROM), random access memory (RAM), CD-ROM, personal computers and computer displays, and/or any other suitable hardware and/or software programs, components, and/or devices.

It will be further appreciated by those skilled in the art that modifications to and variations of the above-described systems and methods may be made without departing from the inventive concepts disclosed herein. Accordingly, the disclosure should not be viewed as limited except as by the scope and spirit of the appended claims.

What is claimed is:

1. A method of routing data units in a read-data transfer transaction, the read-data transfer transaction involving a host device, the method comprising the steps of:
    preparing a read request data packet for requesting read-data from the host device, the read request data packet including a tag field defining at least one tag value, the at least one tag value corresponding to at least one transaction parameter;
    transmitting the read request data packet for receipt at the host device;
    receiving at least one completion data packet from the host device, the at least one completion data packet including the read-data and the tag field defining the at least one tag value;
    recovering the at least one transaction parameter from at least one first multi-bit storage location using the at least one tag value defined by the tag field included in the at least one completion data packet;
    identifying, using the at least one transaction parameter, at least one second multi-bit storage location where the read-data are to be transmitted; and
    transmitting the read-data to the at least one second multi-bit storage location.

2. The method of claim 1 wherein the at least one first multi-bit storage location corresponds to at least a part of a first memory.

3. The method of claim 2 further comprising:
    assigning the at least one tag value to at least one address for the at least one first multi-bit storage location in the first memory.

4. The method of claim 2 wherein the tag field includes a first bit field for storing a string of bits, wherein the string of bits defines the at least one address, and wherein the recovering of the at least one transaction parameter includes reading the at least one transaction parameter from the at least one first multi-bit storage location at the at least one address defined by the string of bits.

5. The method of claim 1 wherein the at least one second multi-bit storage location corresponds to at least a part of a second memory, wherein the at least one transaction parameter is represented by a first string of bits at least partially defining at least one address for the at least one second multi-bit storage location in the second memory, and wherein the transmitting of the read-data includes writing the read-data to the at least one second multi-bit storage location at the at least one address at least partially defined by the first string of bits.

6. The method of claim 5 wherein the tag field includes a second bit field for storing a second string of bits.

7. The method of claim 6 further comprising:
    concatenating the second string of bits to the first string of bits to define the at least one address for the at least one second multi-bit storage location in the second memory.

8. The method of claim 5 further comprising:
    concatenating a second string of bits defining a predetermined fixed partial address to the first string of bits to define the at least one address for the at least one second multi-bit storage location in the second memory.

9. The method of claim 1 wherein the recovering of the at least one transaction parameter includes selecting the at least one transaction parameter from among a plurality of transaction parameters based on the at least one tag value.

10. The method of claim 9 wherein the at least one second multi-bit storage location corresponds to at least a part of a second memory, wherein the at least one transaction parameter is represented by a string of bits, and wherein the identifying of the at least one second multi-bit storage location includes determining at least one address for the at least one second multi-bit storage location using the string of bits representing the at least one transaction parameter.

11. The method of claim 9 wherein the tag field includes a first bit field for storing a first string of bits, and a second bit field for storing a second string of bits, wherein the first string of bits define the at least one tag value, and wherein the at least one transaction parameter is represented by a third string of bits.

12. The method of claim 11 further comprising:
    concatenating the second string of bits from the tag field to the third string of bits representing the at least one transaction parameter.

13. The method of claim 11 wherein the at least one second multi-bit storage location corresponds to at least a part of a second memory, and wherein the identifying of the at least one second multi-bit storage location includes determining at least one address for the at least one second multi-bit storage location using the second string of bits from the tag field concatenated to the third string of bits representing the at least one transaction parameter.

14. A system for routing data units in a read-data transfer transaction from a host device to a data storage, the system comprising:
    at least one data routing component; and
    at least one memory including at least one first multi-bit storage location, the at least one first multi-bit storage location being operative to store at least one transaction parameter,
    wherein the at least one data routing component is operative:
    to prepare a read request data packet for requesting read-data from the host device, the read request data packet including a tag field defining at least one tag value, the at least one tag value corresponding to the at least one transaction parameter;

to transmit the read request data packet for receipt at the host device;

to receive at least one completion data packet from the host device, the at least one completion data packet including the read-data and the tag field defining the at least one tag value;

to recover the at least one transaction parameter from the at least one first multi-bit storage location using the at least one tag value defined by the tag field included in the at least one completion data packet;

to identify, using the at least one transaction parameter, at least one second multi-bit storage location in the data storage where the read-data are to be transmitted; and to transmit the read-data to the at least one second multi-bit storage location in the data storage.

15. The system of claim 14 wherein the at least one data routing component is further operative to assign the at least one tag value to at least one address for the at least one first multi-bit storage location in the at least one memory.

16. The system of claim 15 wherein the tag field includes a first bit field for storing a string of bits, and wherein the string of bits defines the at least one address.

17. The system of claim 16 wherein the at least one data routing component is further operative to read the at least one transaction parameter from the at least one first multi-bit storage location at the at least one address defined by the string of bits.

18. The system of claim 14 wherein the at least one transaction parameter is represented by a first string of bits at least partially defining at least one address for the at least one second multi-bit storage location in the data storage.

19. The system of claim 18 wherein the at least one data routing component is further operative to write the read-data to the at least one second multi-bit storage location at the at least one address at least partially defined by the first string of bits.

20. The system of claim 18 wherein the tag field includes a second bit field for storing a second string of bits.

21. The system of claim 20 wherein the at least one data routing component is further operative to concatenate the second string of bits to the first string of bits to define the at least one address for the at least one second multi-bit storage location in the data storage.

22. The system of claim 18 wherein the at least one data routing component is further operative to concatenate a second string of bits defining a predetermined fixed partial address to the first string of bits to define the at least one address for the at least one second multi-bit storage location in the data storage.

23. The system of claim 14 wherein the at least one data routing component is further operative to select the at least one transaction parameter from among a plurality of transaction parameters based on the at least one tag value.

24. The system of claim 23 wherein the tag field includes a first bit field for storing a first string of bits, and a second bit field for storing a second string of bits, wherein the first string of bits define the at least one tag value, and wherein the at least one transaction parameter is represented by a third string of bits.

25. The system of claim 24 wherein the at least one data routing component is further operative to concatenate the second string of bits to the third string of bits representing the at least one transaction parameter.

26. The system of claim 24 wherein the at least one data routing component is further operative to identify the at least one second multi-bit storage location using the second string of bits from the tag field concatenated to the third string of bits representing the at least one transaction parameter.

27. The system of claim 14 wherein the at least one data routing component is further operative to store the at least one transaction parameter in the at least one first multi-bit storage location.

28. The system of claim 14 wherein the at least one data routing component comprises at least one of a direct memory access (DMA) processing engine, a processor, a bus-bridge, and a bus master.

29. The system of claim 28 wherein the processor comprises one of a central processing unit (CPU), a microprocessor, and a microcontroller.

30. A system for routing data units in a read-data transfer transaction, the read-data transfer transaction involving a host device, the system comprising:

at least one data routing component;

at least one first memory including at least one first multi-bit storage location, the at least one first multi-bit storage location being operative to store at least one transaction parameter; and at least one second memory including at least one second multi-bit storage location, wherein the at least one data routing component is operative:

to prepare a read request data packet for requesting read-data from the host device, the read request data packet including a tag field defining at least one tag value, the at least one tag value corresponding to the at least one transaction parameter;

to transmit the read request data packet for receipt at the host device;

to receive at least one completion data packet from the host device, the at least one completion data packet including the read-data and the tag field defining the at least one tag value;

to recover the at least one transaction parameter from the at least one first multi-bit storage location in the at least one first memory using the at least one tag value defined by the tag field included in the at least one completion data packet;

to identify, using the at least one transaction parameter, the at least one second multi-bit storage location in the at least one second memory where the read-data are to be transmitted; and to transmit the read-data to the at least one second multi-bit storage location in the at least one second memory.

31. The system of claim 30 wherein the at least one data routing component is further operative to store the at least one transaction parameter in the at least one first multi-bit storage location.

32. The system of claim 30 wherein the at least one data routing component comprises at least one of a direct memory access (DMA) processing engine, a processor, a bus-bridge, and a bus master.

33. The system of claim 32 wherein the processor comprises one of a central processing unit (CPU), a microprocessor, and a microcontroller.

* * * * *